US012761485B2

(12) United States Patent
Chang et al.

(10) Patent No.: US 12,761,485 B2
(45) Date of Patent: Oct. 13, 2026

(54) HEAD-MOUNTED DISPLAY DEVICE

(71) Applicant: HTC Corporation, Taoyuan (TW)

(72) Inventors: Li-Hsun Chang, Taoyuan (TW); Kuan-Ying Ou, Taoyuan (TW); Qing-Long Deng, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 171 days.

(21) Appl. No.: 18/973,110

(22) Filed: Dec. 9, 2024

(65) Prior Publication Data

US 2025/0251602 A1 Aug. 7, 2025

Related U.S. Application Data

(60) Provisional application No. 63/550,041, filed on Feb. 6, 2024.

(51) Int. Cl.
*G02B 27/01* (2006.01)

(52) U.S. Cl.
CPC .. *G02B 27/0172* (2013.01); *G02B 2027/0178* (2013.01)

(58) Field of Classification Search
CPC .................................................. G02B 27/0172
See application file for complete search history.

(56) References Cited

U.S. PATENT DOCUMENTS

2020/0051320 A1* 2/2020 Laffont .............. G02B 27/0093

* cited by examiner

*Primary Examiner* — Joseph P Martinez
(74) *Attorney, Agent, or Firm* — JCIPRNET

(57) ABSTRACT

A head-mounted display device includes a body, a first clamping part, a second clamping part and a sliding part. The body has a lens holder and two optical lens sets. The lens holder is used for accommodating a first lens and a second lens corresponding to both eyes. The first clamping member is disposed on the body and has a first free end portion. The second clamping member is disposed on the body and has a second free end portion. The sliding part is slidably disposed on the body and between the first free end portion and the second free end portion. When the sliding part slides along a first direction from an initial position, it first pushes the first free end portion and the second free end portion to make them abut against the first lens and the second lens respectively, and then pushes the first free end portion and the second lens portion to make them drive the first lens and the second lens to move respectively to change the distance from the body.

5 Claims, 5 Drawing Sheets

HEAD-MOUNTED DISPLAY DEVICE

CROSS-REFERENCE TO RELATED APPLICATION

The application claims the priority benefit of U.S. provisional application Ser. No. 63/550,041, filed on Feb. 6, 2024. The entirety of the above-mentioned patent application is hereby incorporated by reference herein and made a part of this specification.

BACKGROUND

Technical Field

The application relates to a head-mounted display device, and in particular, to a head-mounted display device that allows users to prepare correction lenses for use.

Description of Related Art

With the rapid advancement of current science and technology, the types and functions of head-mounted display devices are becoming increasingly diversified. Taking augmented reality head-mounted display devices as an example, if the user has common vision problems such as nearsightedness, farsightedness or astigmatism and wants to wear an augmented reality head-mounted display device, he must prepare another pair of vision correction lenses and place them on a lens frame, and then assemble the lens frame to the device so that it is between the device and the user's eyes. When different users use the same augmented reality head-mounted display device, they must also change their own vision correction lenses and lens frame. However, assembly problems between the lens frame and the device can also affect the effectiveness of vision correction.

SUMMARY

The present application provides a head-mounted display device, which can improve the problem of inconvenient combination with user-prepared vision correction lenses.

The head-mounted display device of the present application includes a body, a first clamping part, a second clamping part and a sliding part. The body has a lens holder and two optical lens sets. The lens holder is used for accommodating a first lens and a second lens corresponding to both eyes. The first clamping member is disposed on the body and has a first free end portion. The first free end portion is used to contact the first lens. The second clamping member is disposed on the body and has a second free end portion. The second free end portion is used to contact the second lens. The sliding part is slidably disposed on the body and between the first free end portion and the second free end portion. When the sliding part slides along a first direction from an initial position, it first pushes the first free end portion and the second free end portion to make them abut against the first lens and the second lens respectively, and then pushes the first free end portion and the second lens portion to make them drive the first lens and the second lens to move respectively to change the distance from the body.

Based on above, in the head-mounted display device of the application, the lens holder is combined with the body, so there is no problem of assembly and alignment between the lens holder and the body, and the lens can be fixed in place by simply operating the sliding part.

DESCRIPTION OF THE EMBODIMENTS

Figure 1:
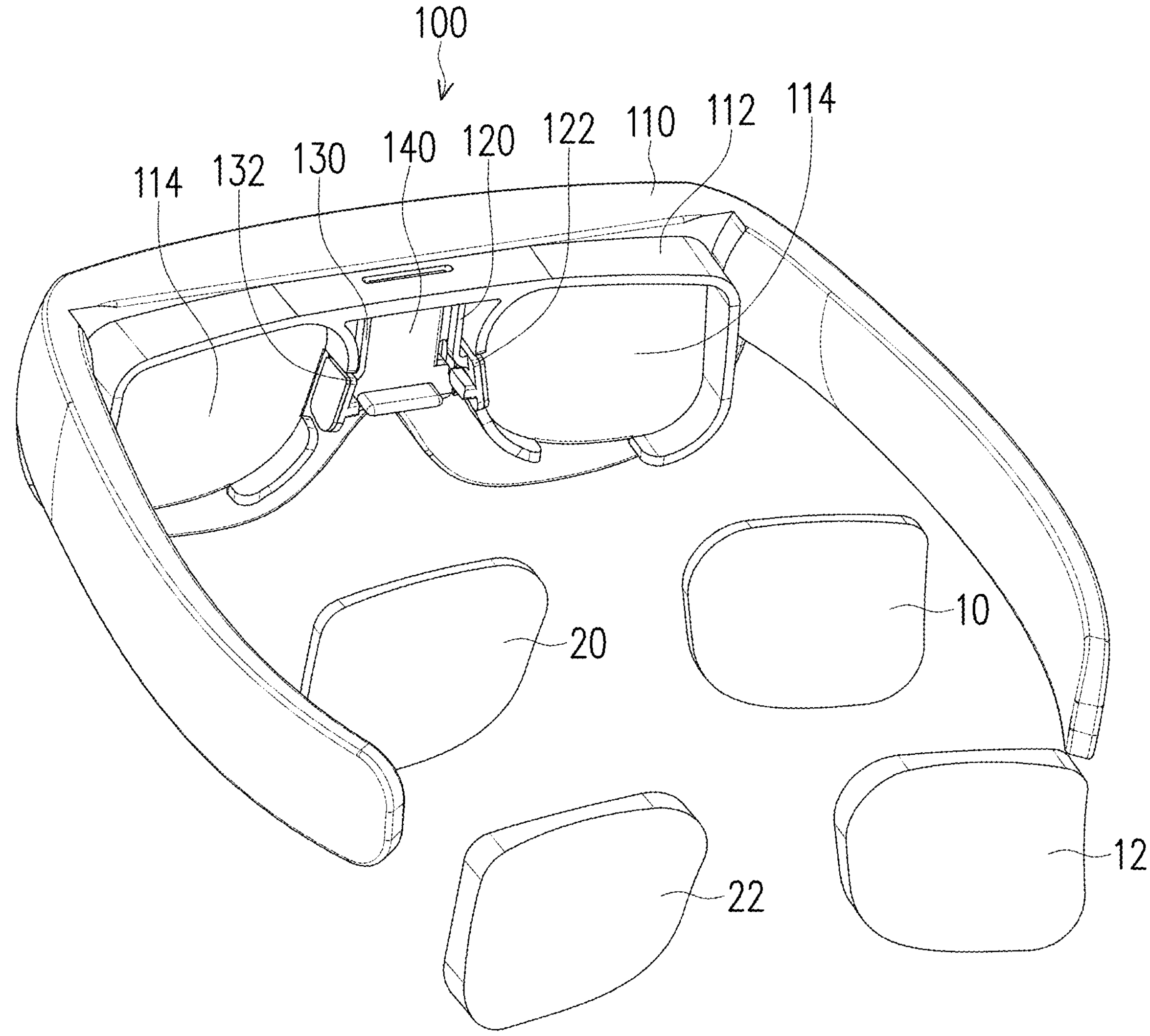
FIG. 1 is a schematic diagram of the head-mounted display device in a disassembled state according to an embodiment of the present invention.

FIG. 1 is a schematic diagram of the head-mounted display device in a disassembled state according to an embodiment of the present invention. Referring to FIG. 1, the head-mounted display device 100 of the embodiment includes a body 110, a first clamping part 120, a second clamping part 130 and a sliding part 140. The body 110 has a lens holder 112 and two optical lens sets 114. The lens holder 112 is used for accommodating a first lens 10 and a second lens 20 corresponding to both eyes. The two optical lens sets 114 correspond to both eyes respectively.

In the embodiment, the body 110 can, for example, be applied in the fields of virtual reality system, augmented reality system or mixed reality system. The body 110 can include components such as optical systems and protective housings, and can be equipped with or suitable for placing displays. The aforementioned display can be a built-in display or an external portable display (such as a smartphone, etc.), but the application is not limited thereto. The optical system includes optical elements used to change the light path of the display, such as lenses, light guides, prisms, etc. For example, the body 110 of the embodiment further includes a display (not shown), and the two optical lens sets 114 are located between the display and the user's eyes. In details, corresponding to the virtual reality system, the augmented reality system, or the mixed reality system, the display can be a variety of different types of displays, but the embodiment is not limited thereto. Therefore, the light emitted by the display of the body 110 can penetrate the optical lens sets 114 and enter the user's eyes, or the external light can penetrate the optical lens sets 114 and enter the user's eyes. However, in another embodiment, the body 110 may not have a display, that is, it may not have a display function, but still have the two optical lens sets 114. Besides, the body 110 in FIG. 1 is shown as having a slightly larger volume, but the body 110 can also be in the form of thinner glasses or other forms with larger volume. The first lens 10 and the second lens 20 of the embodiment are, for example, located between the optical lens sets 114 and the user's eyes.

The first lens 10 and the second lens 20 are not part of the head-mounted display device 100 of the embodiment. That is, when the user obtains the head-mounted display device 100 of the embodiment, the first lens 10 and the second lens 20 may not be included. Because the head-mounted display device 100 is designed for use by all users, it may not have functions that can accommodate the vision correction needs of individual users. If the users have vision problems such as nearsightedness, farsightedness or astigmatism, they can prepare the first lens 10 and the second lens 20 with corresponding vision correction functions and install them on the lens holder 112 to obtain a better visual experience. When the head-mounted display device 100 is used by other users, since different users require different vision correction effects, new users can prepare a first lens 12 and a second lens 22 with vision correction functions suitable for them and install the lenses on the lens holder 112, so that they can also get a better visual experience.

The first clamping part 120 is disposed on the body 110 and has a first free end portion 122. That is, the first clamping part 120 is fixed at the other end relative to the first free end portion 122, and the first free end portion 122 is movable. The first free end portion 122 is used to contact the first lens 10. Similar to the first clamping part 120, the second clamping part 130 is disposed on the body 110 and has a second free end portion 132. The second free end portion 132 is used to contact the second lens 20. The sliding part 140 is slidably disposed on the body 110. That is, the sliding part 140 can slide on the body 110, but is restricted from leaving the body 110. The sliding part 140 is located between the first free end portion 122 and the second free end portion 132.

Figure 2A:
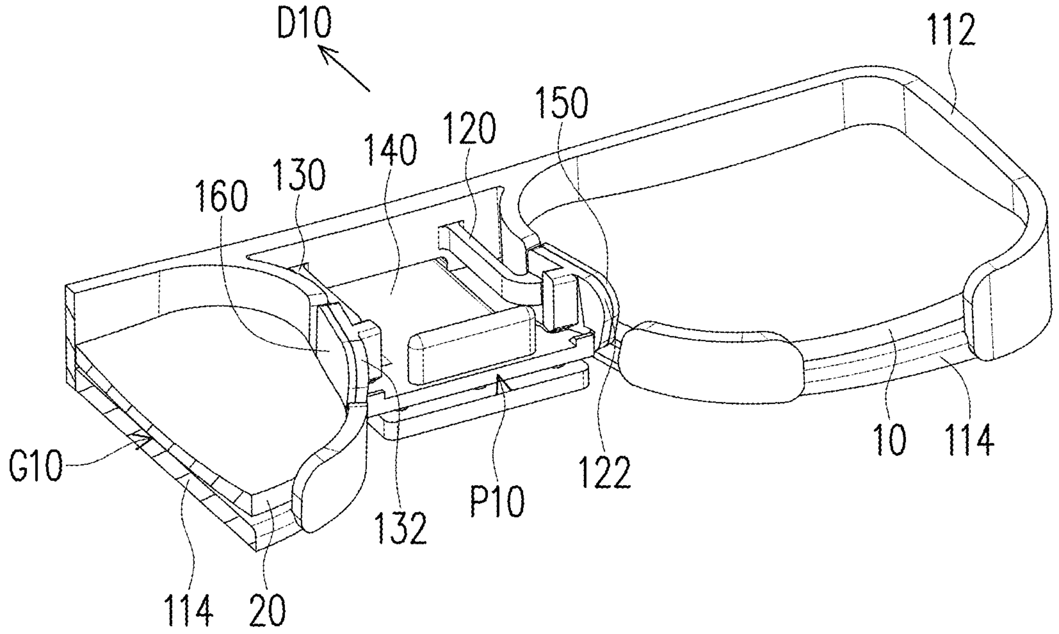
FIG. 2A is a schematic diagram of the lens holder portion of the head-mounted display device of FIG. 1.
Figure 2B:
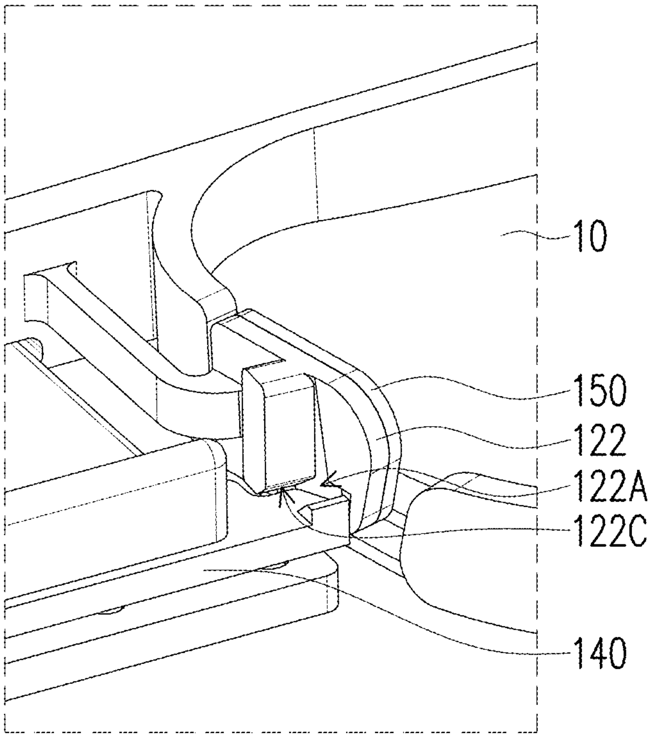
FIG. 2B is a partial enlarged schematic diagram of FIG. 2A.
Figure 2C:
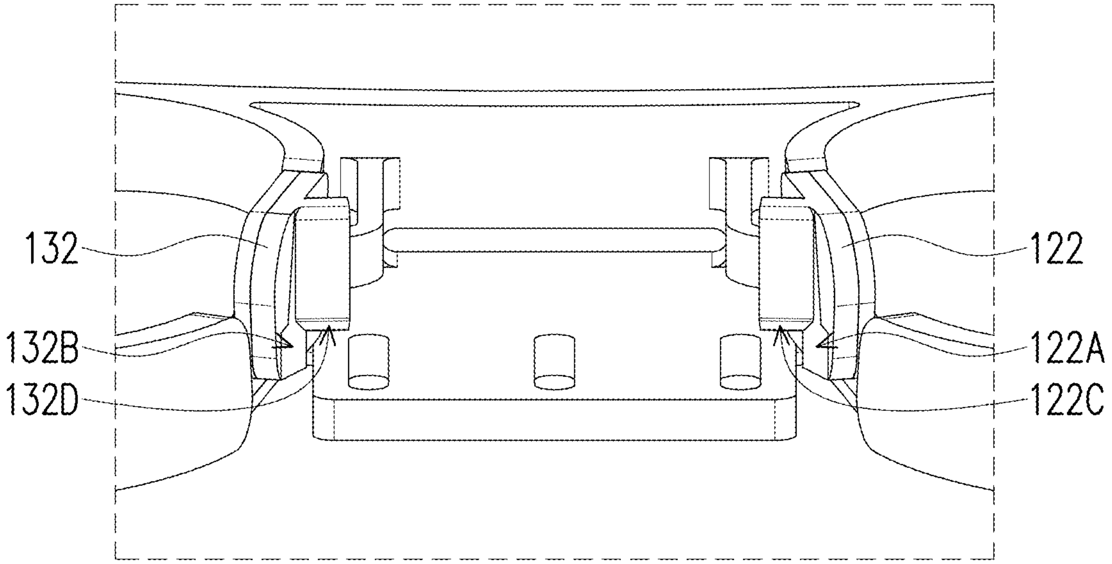
FIG. 2C is a partial enlarged schematic diagram of FIG. 2A after removing the sliding part and changing the viewing angle.
Figure 2D:
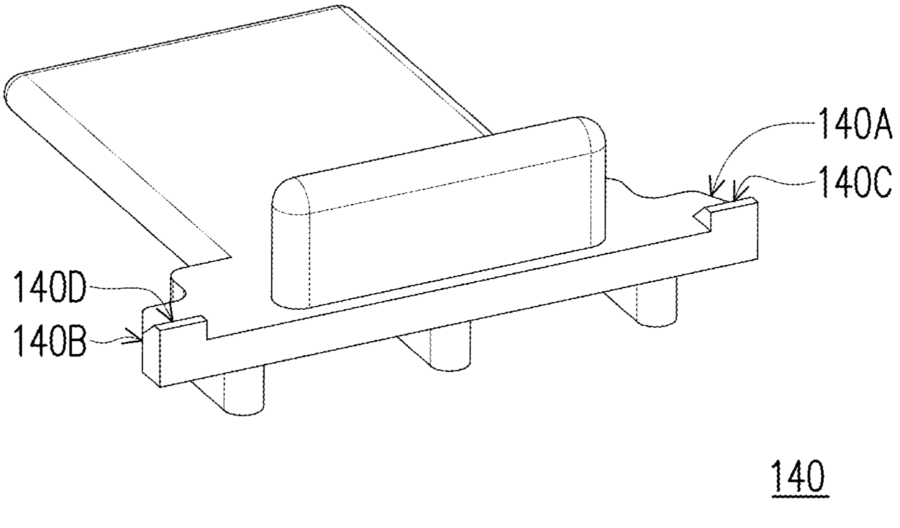
FIG. 2D is a schematic diagram of the sliding part of FIG. 2A.

FIG. 2A is a schematic diagram of the lens holder portion of the head-mounted display device of FIG. 1. FIG. 2B is a partial enlarged schematic diagram of FIG. 2A. FIG. 2C is a partial enlarged schematic diagram of FIG. 2A after removing the sliding part and changing the viewing angle. FIG. 2D is a schematic diagram of the sliding part of FIG. 2A. Referring to FIG. 2A to FIG. 2D, the user first intuitively places the first lens 10 and the second lens 20 in the lens holder 112. At this time, the first lens 10 and the second lens 20 are in natural contact with the optical lens sets 114 in the body 110 due to the influence of gravity. Therefore, a minimum distance G10 between the first lens 10 and the second lens 20 and the optical lens sets 114 in the body 110 is zero.

In the embodiment, the first free end portion 122 has a first inclined surface 122A and a third inclined surface 122C. The second free end portion 132 has a second inclined surface 132B and a fourth inclined surface 132D. When the sliding part 140 slides along a first direction D10 from an initial position P10 in FIG. 2A, it first contacts the first inclined surface 122A of the first free end portion 122 and the second inclined surface 132B of the second free end portion 132. The force exerted by the sliding part 140 on the first inclined surface 122A causes the first free end portion 122 to move in the direction of the first lens 10. The force exerted by the sliding part 140 on the second inclined surface 132B causes the second free end portion 132 to move in the direction of the second lens 20.

Figure 3A:
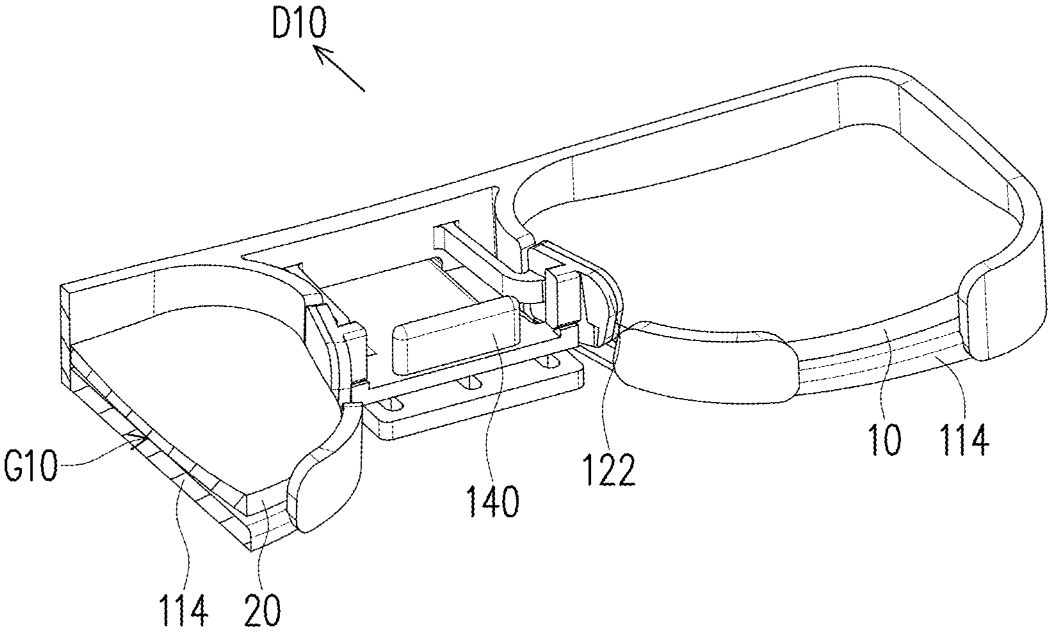
FIG. 3A is a schematic diagram after the sliding part slides a distance in FIG. 2A.
Figure 3B:
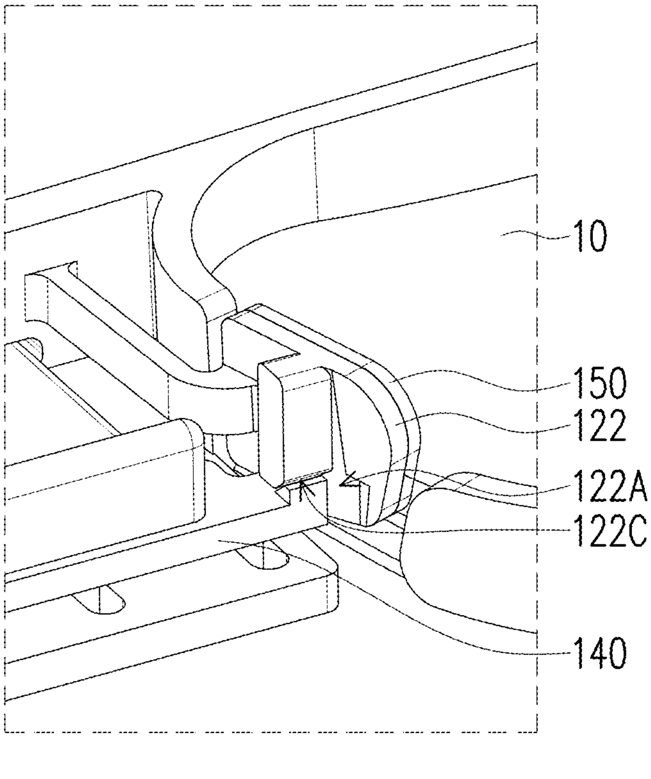
FIG. 3B is a partial enlarged schematic diagram of FIG. 3A.

FIG. 3A is a schematic diagram after the sliding part slides a distance in FIG. 2A. FIG. 3B is a partial enlarged schematic diagram of FIG. 3A. Referring to FIG. 3A and FIG. 3B, when the sliding part 140 slides a distance along the first direction D10 from the initial position P10 of FIG. 2A, the first free end portion 122 and the second free end portion 132 may be pushed to positions that abut the first lens 10 and the second lens 20. At this time, the sliding part 140 has not yet contacted the third inclined surface 122C and the fourth inclined surface 132D (marked in FIG. 2C), and the first lens 10 and the second lens 20 have not yet moved. Therefore, the minimum distance G10 between the optical lens sets 114 within the body 110 remains zero.

Figure 4A:
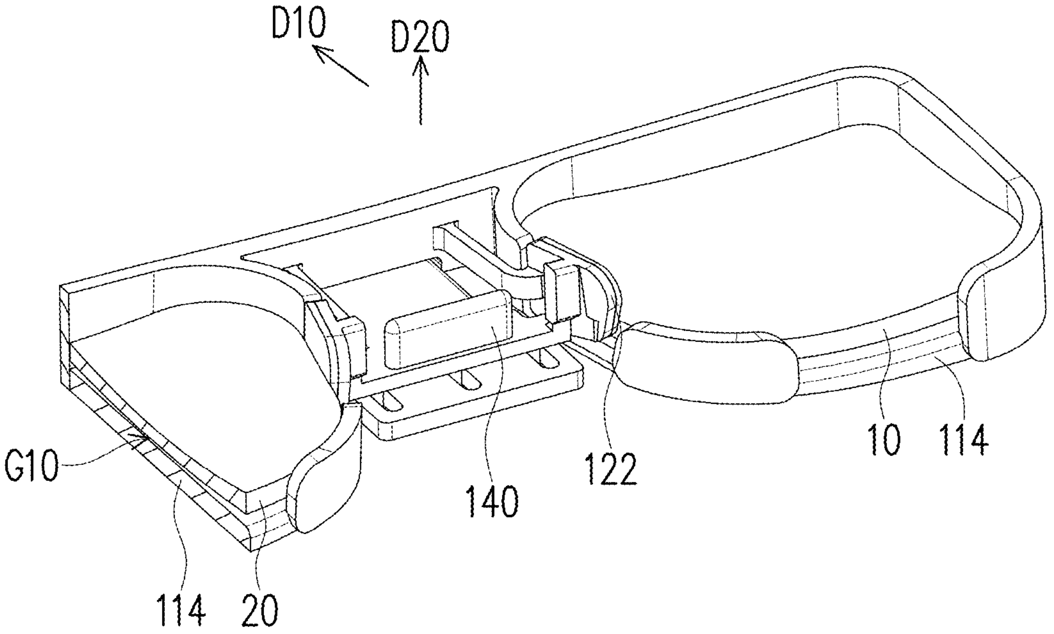
FIG. 4A is a schematic diagram after the sliding part further slides a distance in FIG. 3A.
Figure 4B:
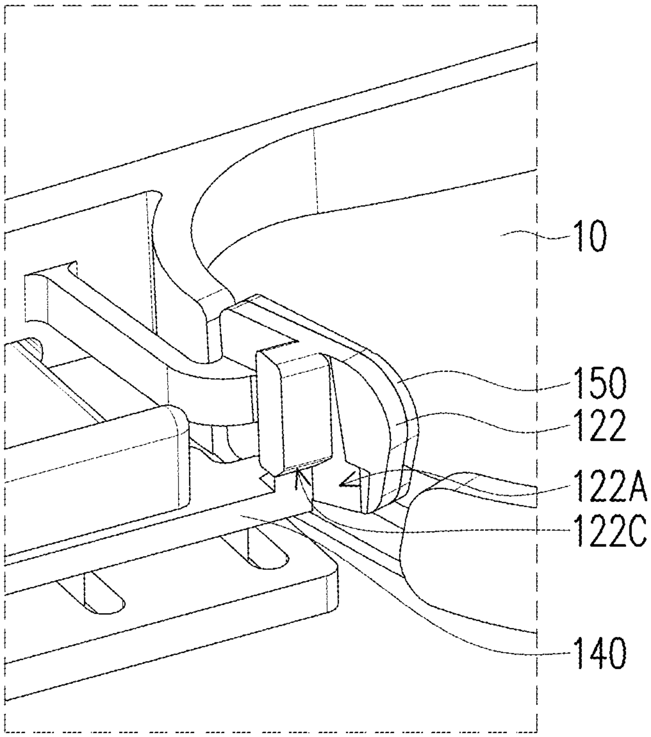
FIG. 4B is a partially enlarged schematic diagram of FIG. 4A.

FIG. 4A is a schematic diagram after the sliding part further slides a distance in FIG. 3A. FIG. 4B is a partially enlarged schematic diagram of FIG. 4A. Referring to FIG. 4A and FIG. 4B, when the sliding part 140 further slides a distance along the first direction D10 from the position of FIG. 3A, the sliding part 140 may contact the third inclined surface 122C and the fourth inclined surface 132D. The force exerted by the sliding part 140 on the third inclined surface 122C pushes the first free end portion 122, so that the first free end portion 122 drives the first lens 10 to move in a direction away from the optical lens sets 114. The force exerted by the sliding part 140 on the fourth inclined surface 132D pushes the second free end portion 132, so that the second free end portion 132 drives the second lens 20 to move in a direction away from the optical lens sets 114. Therefore, the distance G10 between the first lens 10 and the second lens 20 and the optical lens sets 114 in the body 110 increases from zero, that is, the first lens 10 and the second lens 20 maintain a gap with the optical lens sets 114 respectively. In this way, the wear caused by the contact between the first lens 10 and the optical lens sets 114 and the contact between the second lens 20 and the optical lens sets 114 can be avoided, and the loss of light energy generated by light leakage caused by the contact between the two can also be avoided.

Due to the cooperation of the first clamping part 120, the second clamping part 130 and the sliding part 140, even if the first lens 10 and the second lens 20 of different thicknesses are replaced, the gap between the first lens 10 and the optical lens sets 114 and the gap between the second lens 20 and the optical lens sets 114 can also be adjusted to an ideal size without contacting each other. In this way, the friction and damage caused by the contact between the first lens 10 and the optical lens sets 114 and the contact between the second lens 20 and the optical lens sets 114 can be avoided, and the loss of light energy generated by light leakage caused by the contact between the two can also be avoided. On the other hand, if the gap is too large without restriction, consider the possibility of using thicker correction lenses, which will further increase the distance between the optical lens sets 114 and the eyes, resulting in a narrowing of the field of view. Moreover, it is easy for both eyes to see the edges of the optical lens sets 114, which reduces the user experience.

Referring to FIG. 1, in the embodiment, the first clamping part 120, the second clamping part 130 and the lens holder 112 can be integrally formed, but the application is not limited thereto. Besides, the head-mounted display device 100 of the embodiment can further include a first friction part 150 and a second friction part 160, which is respectively disposed on the first free end portion 122 and the second free end portion 132 and is used to contact the first lens 10 and the second lens 20. The material of the first friction part 150 and the second friction part 160 is, for example, rubber or other suitable materials, so as to effectively drive the first lens 10 and the second lens 20 to move.

Referring to FIG. 2A and FIG. 2D, in the embodiment, the part of the sliding part 140 that contacts the first inclined surface 122A is the inclined surface 140A, the part that contacts the third inclined surface 122C is the inclined surface 140C, the part that contacts the second inclined surface 132B is the inclined surface 140B, and the part that contacts the fourth inclined surface 132D is the inclined surface 140D, but the application is not limited thereto. On the other hand, it can also be that the sliding part 140 contacts the first free end portion 122 and the second free end portion 132 which are inclined surfaces, and the appearance of the parts corresponding to the first free end portion 122 and the second free end portion 132 is not limited. Or, the appearance of the three can be other appropriate matching forms, as long as the sliding part 140 can smoothly push the first free end portion 122 and the second free end portion 132 to the first lens 10 and the second lens 20 respectively. And then, the first free end portion 122 and the second free end portion 132 are pushed to drive the first lens 10 and the second lens 20 to move away from the body 110 respectively. Referring to FIG. 4A, for example, a movement direction D20 of the first lens 10 and the second lens 20 is perpendicular to the first direction D10, but the application is not limited thereto.

In summary, in the head-mounted display device of the application, the body and the lens holder are originally integrated together, so the user does not need to assemble the lens holder to the body, nor does it need to be aligned. Moreover, after the user puts the vision correction lenses into the lens holder, they only need to operate the sliding part to maintain zero contact between the lens surface of the vision correction lenses and the device, improving the reliability of the product. Not only can users prepare their own vision correction lenses in conjunction with the head-mounted display device, the lenses can also be simply assembled directly onto the head-mounted display device and aligned with the optical lens sets in the device, making it simple and lightweight.

What is claimed is:

1. A head-mounted display device, comprising:

a body, having a lens holder and two optical lens sets, wherein the lens holder is used for accommodating a first lens and a second lens corresponding to both eyes;

a first clamping part, disposed on the body and has a first free end portion, wherein the first clamping part is used to contact the first lens;

a second clamping part, disposed on the body and has a second free end portion, wherein the second free end portion is used to contact the second lens; and a sliding part, slidably disposed on the body and between the first free end portion and the second free end portion, wherein when the sliding part slides along a first direction from an initial position, it first pushes the first free end portion and the second free end portion to make them abut against the first lens and the second lens respectively, and then pushes the first free end portion and the second lens portion to make them drive the first lens and the second lens to move respectively to change the distance from the body.

2. The head-mounted display device according to claim 1, wherein the first clamping part, the second clamping part and the lens holder are integrally formed.

3. The head-mounted display device according to claim 1, wherein the first free end portion has a first inclined surface and a third inclined surface, the second free end portion has a second inclined surface and a fourth inclined surface, when the sliding part slides along the first direction from the initial position, it first contacts the first inclined surface and the second inclined surface, and then contacts the third inclined surface and the fourth inclined surface.

4. The head-mounted display device according to claim 1, further comprises a first friction part and a second friction part, respectively disposed on the first free end portion and the second free end portion and used to contact the first lens and the second lens.

5. The head-mounted display device according to claim 1, wherein a moving direction of the first lens and the second lens are perpendicular to the first direction.

* * * * *